April 27, 1954 S. B. COHEN 2,677,054

SMOOTHING CIRCUIT

Filed March 29, 1950 4 Sheets-Sheet 1

INVENTOR
SIDNEY B. COHEN
BY Paul B. Hunter
ATTORNEY

April 27, 1954 S. B. COHEN 2,677,054

SMOOTHING CIRCUIT

Filed March 29, 1950 4 Sheets-Sheet 2

INVENTOR
SIDNEY B. COHEN
BY Paul B. Hunter
ATTORNEY

April 27, 1954 S. B. COHEN 2,677,054

SMOOTHING CIRCUIT

Filed March 29, 1950 4 Sheets-Sheet 4

INVENTOR
SIDNEY B. COHEN
BY
Paul B. Hunter
ATTORNEY

INVENTOR
SIDNEY B. COHEN
BY
Paul B. Hunter
ATTORNEY

Patented Apr. 27, 1954

2,677,054

UNITED STATES PATENT OFFICE 2,677,054

SMOOTHING CIRCUIT

Sidney B. Cohen, Brooklyn, N. Y., assignor to The Sperry Corporation, a corporation of Delaware Application March 29, 1950, Serial No. 152,729

10 Claims. (Cl. 250—27)

This invention relates to "smoothing" circuits and more particularly to such circuits useful in smoothing data whose frequency varies over wide ranges.

In the design of fire control computors or servo systems it is frequently desired to take a signal whose amplitude is varying rapidly with time and derive a signal in which these sharp discontinuities are smoothed or integrated. In control amplifiers with reversing phase alternating current input and output, there exist two familiar general methods of establishing a dependence of the output voltage upon the history of the input voltage:

(a) Utilize frequency sensitive networks tuned to the carrier frequency (which is to say, tuned to the power frequency), achieving so-called "resonate-rate" and "resonate-integral."

(b) Demodulate the carrier with its signal modulation, insert direct current "integral networks" and then modulate the carrier.

The "resonate-rate" method has one cardinal virtue: There can be no change in static null-point originating in the rate producing circuit. This feature is vital to any servo system which must track for long periods of time without readjustment of the null.

However, such a method of smoothing has one glaring limitation. The carrier frequency, which is to say the power frequency, must be stable. In many cases, the degree of frequency-stability required becomes completely unrealisable.

The "demodulate-remodulate" techniques behave in a manner independent of even quite large changes in carrier frequency. However, such methods have the design disadvantage of requiring a large number of non-linear elements necessary for reliable and quick operation (full-wave demodulator plus full-wave modulator requires eight such elements). In addition this method of smoothing has a performance limitation springing from its drift characteristics. That is, the output of such a system contains voltages which are independent of the input voltage. These voltages are dependent on the condition of the non-linear elements, which in turn are time dependent.

Accordingly, it is an object of the present invention to provide a smoothing circuit whose performance characteristics are independent of the carrier frequency utilized.

It is another object of the present invention to provide an improved smoothing circuit which utilizes a minimum number of non-linear elements.

A further object of the present invention is to provide a full wave demodulator utilized as a two terminal impedance.

An additional object of the present invention is to provide an impedance whose magnitude varies as a function of the inverse derivative of the voltage applied across it.

In accordance with the present invention, it is proposed to utilize a phase-sensitive demodulator, whose load consists of a condenser shunted by a resistor, as a two-terminal circuit element. The alternating current voltage observed across the two output terminals is a "smoothed" version of the voltage applied to the input terminals. That is, rapid fluctuations in the alternating voltage amplitude applied to the input of this network do not appear as an output voltage, whereas slow changes do appear. The transition period between the rate of fluctuation which does and that which does not appear in the output depends upon the time constant R. C. of the demodulator circuit and the time constant of the input or charging circuit.

This phenomenon is due to the dependence of the impedance looking into the input terminals of the demodulator upon the rate of change of signal level. If the signal has constant amplitude, then the demodulator load current is just that due to the resistor. If the voltage is increasing the input impedance of the demodulator decreases, and if the voltage is decreasing the input impedance of the demodulator rises. As a result any rapid fluctuations in the amplitude of the A. C. input are smoothed.

The above and other objects and features of the invention will be better understood by reference to the following description taken in connection with the accompanying drawings, in which like components are designated by like reference numerals and characters and in which.

Figure 1:
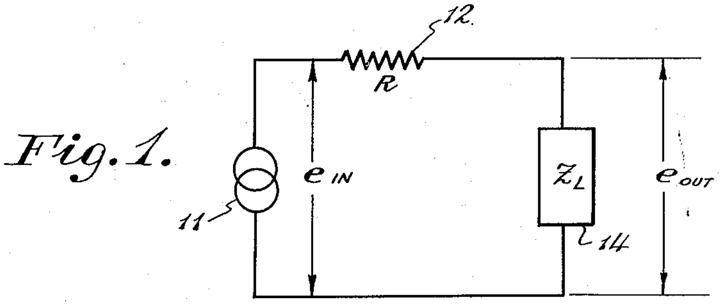
Fig. 1 is a simple schematic diagram useful in explaining the operation of the present invention.

Referring now to Fig. 1 of the drawings there is shown a series circuit composed of an alternating current signal source 11, supplying voltage $e$ in, and two impedances 12 and 14. From Fig. 1 it is obvious that the voltage $e$ out across impedance 14, also designated as $Z_L$, is:

$$e \text{ out} = e \text{ in} \frac{Z_L}{Z_L + R} \quad (1)$$

From this equation it is recognized that under conditions in which R and $Z_L$ remain constant, a change in the input signal $e$ in would produce an immediate proportional change in $e$ out.

However, if the constant $Z_L$ were replaced by a variable $Z_L$ whose impedance varied for transients, $e$ out would no longer vary in direct proportion to $e$ in.

If $Z_L$ were made to vary in such a way as to decrease in value when $e$ in increased and to increase in value when $e$ in decreased, the output voltage would be "smoothed," or technically would be an integral and displacement of the input voltage. If $e$ in increased, the output voltage would also increase, but would not be as large as it would have been had $Z_L$ remained constant. In like manner when $e$ in decreases, the voltage across $Z_L$ would be larger than normal due to the fact that $Z_L$ is larger in value. It should be noted that the variations in $Z_L$ should only occur as a transient phenomenon so that at steady state conditions $e$ out would equal that when $Z_L$ remained constant.

Figure 2:
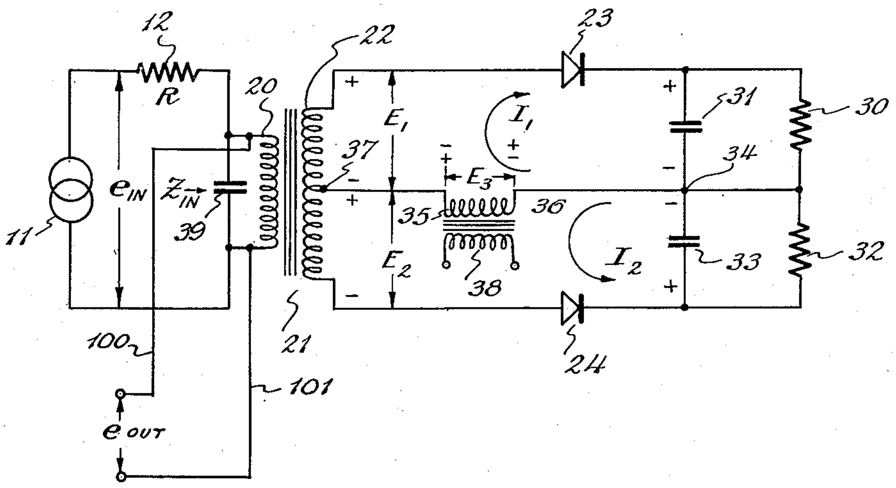
Fig. 2 is a schematic diagram of one embodiment of the present invention.

In order to obtain this variation in $Z_L$ in accordance with the present invention, reference is made to the phase detector circuit of Fig. 2. This figure shows alternating current generator 11 connected in series with impedance element 12 and the primary 20 of transformer 21. Impedance element 12 may be the internal impedance of the generator 11, the plate resistance of a vacuum tube or a pure circuit resistance. The secondary 22 of transformer 21 has each leg connected in series with non-linear elements 23 and 24. Each of these non-linear elements has a load comprising a resistor and condenser connected in parallel, resistor 30 and condenser 31 being connected to element 23, and resistor 32 and condenser 33 being connected to element 24. The opposite ends of these loads are connected together at point 34.

The secondary 35 of transformer 36 is connected between point 34 and the center tap 37 of the secondary 22 of transformer 21. The primary 38 of transformer 36 is connected to a source of reference voltage not shown. This reference voltage should be of the same frequency as the output of alternator 11 and connected either in phase coincidence or phase opposition, as is designated by the polarity indicators.

In operation the impedance of the primary winding 20 of the phase detector changes as a function of the inverse derivative of the modulation of the applied carrier voltage, such as the output of alternator 11. This impedance, designated as Z in, decreases sharply for a step function increase of the modulation and then the impedance gradually returns to its quiescent value. Likewise, the impedance Z in increases sharply for a step function decrease of the modulation and then the impedance gradually returns to its quiescent value. The sharp changes in impedance Z in result from the charging of the output condensers 31 and 33. If the impedance Z in sharply decreases for a given connection of a circuit, the condenser 31 is being charged. If for the same given connection the impedance Z in increases, the condenser 33 is being charged. Since the charging currents are sharp pulses, condenser 39 is connected in parallel with the primary winding 20 of transformer 21 to aid in smoothing the current transients. This aids in minimizing the distortion in the output modulated voltage. In addition condenser 39 aids in making the input impedance more nearly a pure resistance. The "smoothed" signal may be taken across the primary 20 of the transformer 21 by a pair of output connections 100, 101.

Figure 3:
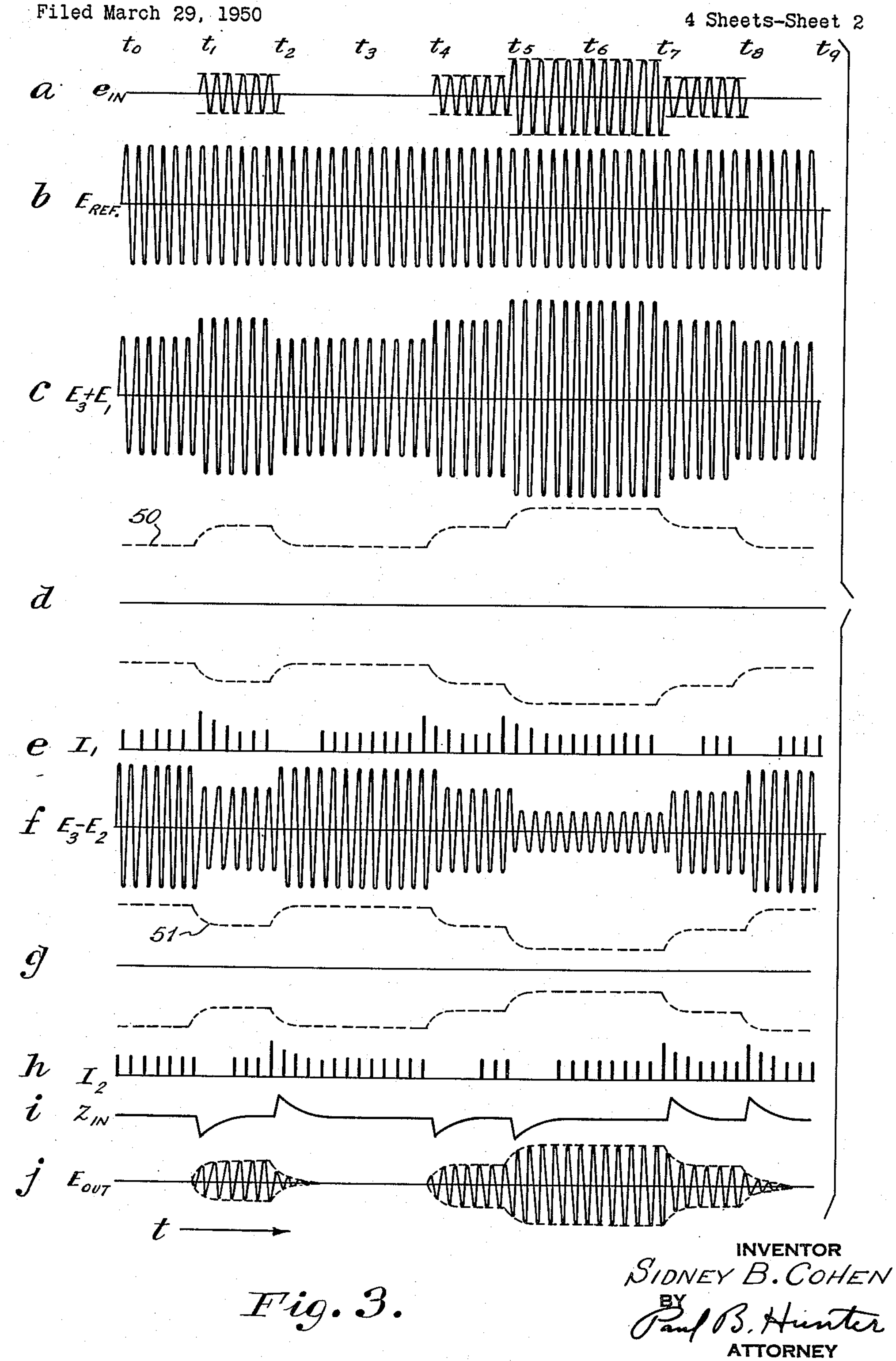
Figs. 3a–3j are a set of curves useful in explaining the operation of the present invention.

In order to more fully understand the above, reference is made to the graphs of Fig. 3. Fig. 3*a* is a plot of a typical input voltage $e$ in. As can be seen $e$ in increases sharply at $t_1$, remains constant to $t_2$ at which time it deacreses sharply to zero, again increases sharply at $t_4$, increases further at $t_5$ where it remains constant to $t_7$ at which time it decreases sharply to an intermediate value which it holds constant to $t_8$ when it again decreases sharply falling to zero. Voltages $E_1$ and $E_2$ developed across each half of the secondary 22 of transformer 21 have similar shapes, the polarity being shown in Fig. 2.

Fig. 3*b* is a graph of the reference voltage $E_3$ developed across the secondary 35 of transformer 36. This reference voltage has a constant magnitude which is greater than the maximum value achieved by $E_1$ and $E_2$, being in phase or out therewith.

Figure 3*c* shows the sum of the reference voltage $E_3$ and voltage $E_1$. This is the voltage impressed across the condenser resistor combination 30, 31 neglecting the drop across element 23 and the effect of series impedance element 12 being reflected in the sceondary. The dashed line 50 shown in Fig. 3*d* indicates the actual voltage across condenser 31. This voltage can exceed the impressed voltage as at $t_2$, but will fall in value until it reaches the value of the impressed voltage. The rate at which the voltage decreases is determined by the time constant of the resistor condenser combination 30, 31. The rate of charge is determined by the time constant of the condenser 31 and the effect of series impedance 12 being reflected into the secondary. The negative half of the envelope exists, of course, only if a full wave demodulator is utilized.

The voltage impressed across resistor condenser combination 32, 33, neglecting the drop across element 24, is shown in Fig. 3*f*. The dashed line 51 shown in Fig. 3*g* indicates the actual voltage across condenser 33. As before this voltage can exceed the impressed voltage as at $t_1$, $t_4$, and $t_5$. The rate at which this voltage falls to the impressed voltage is determined by the time constant of the resistor condenser combination 32, 33. The rate of charge is determined by the time constant of the condenser 33 and the effect of the series resistance 12 being reflected into the secondary.

As the actual voltage across the equivalent circuit suddenly increases, it is recognized that this is accompanied by large pulses of charging current through the non-linear element. Figs. 3*e* and 3*h* are plots of these charging currents labeled $I_1$ and $I_2$. Naturally, if the impressed voltage falls below the actual voltage there can be no charging current pulses as after $t_2$, $t_7$ and $t_8$ in 3*e* and after $t_1$, $e_4$ and $t_5$ in 3*h*.

Figure 3*i* is a plot of the impedance Z in, looking into the primary of transformer 21. It can be seen from the curves 3*a* and 3*e* that at $t_1$ the input voltage is suddenly increased followed by pulses of current $I_1$ to charge condenser 31. Since condenser 33 is charged to a voltage greater than that which is being impressed across it, Fig. 3*f* at $t_1$, no current $I_2$ flows to oppose $I_1$. The effect of this large current $I_1$ flowing in one half of the secondary of transformer 21 unopposed by any current $I_2$ is reflected across the primary 20, where it appears as an extremely low impedance. This is shown in curve 3i by the drop in Z in after $t_1$. As the condenser 31 reaches full charge the charging current $I_1$ diminishes. Furthermore, the voltage across condenser 33 continues to fall until it equals the impressed voltage. At this point, charging current $I_2$ begins to flow opposing current $I_1$. As a result the impedance Z in gradually increases in value until it reaches its quiescent value shortly before $t_2$, when currents $I_1$ and $I_2$ are equal.

At $t_2$ the input voltage decreases sharply to zero. As a result the voltage impressed across condenser 33 suddenly increases with a sharp increase in charging current $I_2$. At the same time the voltage impressed across condenser 31 falls below the value to which this condenser is charged. Therefore, there is no charging current $I_1$ to oppose the sudden flow of current $I_2$. The effect of this large current $I_2$ flowing in one half of the secondary of transformer 21 unopposed by any charging current $I_1$ is reflected across the primary 20. Since the direction of flow of this current is opposite to that in the previous case and the signal voltage is decreased it appears as an extremely high impedance. This is shown in curve 3i and $t_2$ where the impedance value Z in suddenly rises.

As before, the charging current $I_2$ decreases with time. In addition when the voltage on condenser 31 falls below the impressed voltage, charging current $I_1$ begins to flow and oppose $I_2$. As a result, impedance Z in gradually decreases in value until it again reaches its quiescent value when current $I_1$ and $I_2$ are equal.

Thus it is seen that the value of the impedance Z in varies with the input voltage. Although the variations in input voltage are shown as step functions, they may well follow some other function. In such a case, of course, the actual change in the impedance will depend upon the rate at which the input voltage varies. Furthermore it is seen from a comparison of Figs. 3a and 3i that the change in impedance Z in occurs inversely with the rate of change in signal voltage.

Figure 4:
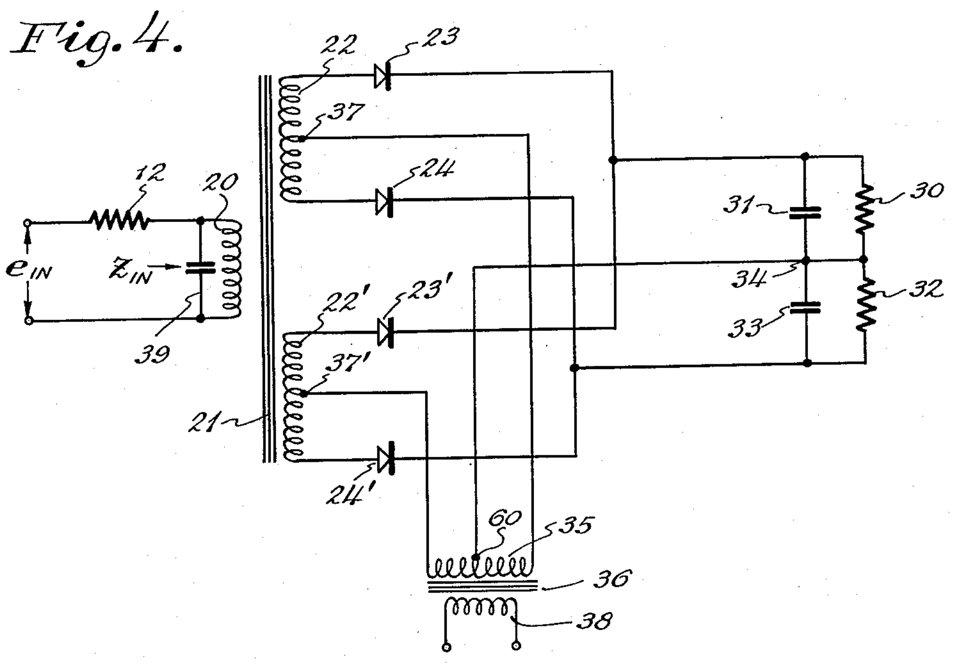
Fig. 4 is a schematic diagram of another embodiment of the present invention.

It is recognized that the device shown in Fig. 2 is only operative during each half cycle, since neither element 23 nor element 24 can pass current during the time the reference voltage is negative. In order to give more complete smoothing action it is necessary to utilize a full wave system. Such a system is shown in Fig. 4, in which the input transformer has two secondary windings 22 and 22'. A pair of non-linear elements 23, 24 and 23', 24' are connected respectively to the legs of each of these windings. A common load, condenser 31, 33 and resistor 30, 32 is connected to the non-linear elements.

The secondary 35 of reference transformer 36 has a center tap 60 which is connected to the point 34 of R. C. loads 31, 30 and 32, 33. Each leg of the secondary 35 is connected respectively to the center taps 37 and 37' of secondaries 22 and 22'.

In operation, elements 23 and 24 can pass charging current to the condenser 31 and 33 during that half cycle when center tap 37 is positive with respect to center tap 60. During the opposite half cycle center tap 37' becomes positive with respect to center tap 60 and elements 23' and 24' pass charging current to condensers 31 and 33. The complete operation of the system proceeds as before, condenser 31 becoming charged during the time the input voltage is increasing and condenser 33 becoming charged during the time the input voltage is decreasing. As before, this charging of condensers 31 and 33 serves to vary the input impedance Z in as the inverse derivative of the input voltage, thereby causing a "smoothed" version of the input voltage to appear across the input terminals.

Figure 5:
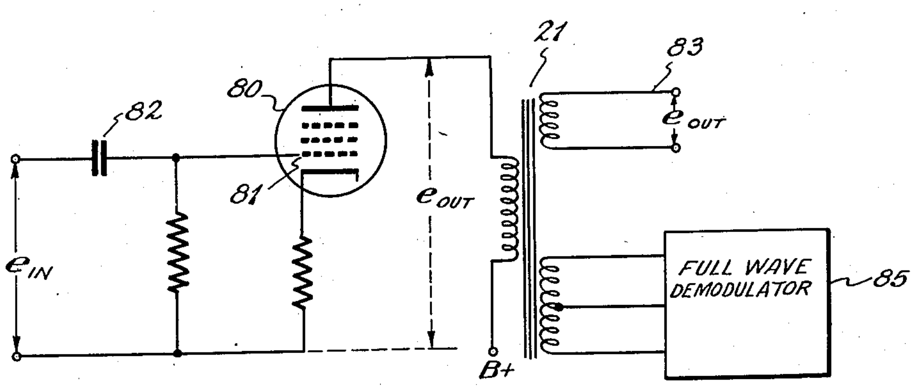
Fig. 5 is a schematic diagram of the present invention connected on the plate loads of a vacuum tube.

In practice, such a system may easily be connected as the plate load of a vacuum tube circuit. Reference to Fig. 5 shows such a circuit diagrammatically, in which pentode tube 80 has the input voltage connected to its control grid 81 through coupling condenser 82. Transformer 21 is connected in the plate circuit of this tube, a full wave demodulator 85 such as the one shown in Fig. 4 being connected to a secondary of a transformer 21. An additional secondary winding 83 is provided for picking off the output wave, although it might also have been taken from the primary side of transformer 21. In such a case the output voltage would be with respect to ground. This is shown in dotted lines and is labeled e out.

Since the input impedance Z in of the full wave demodulator varies inversely with the derivative of the input wave, the output wave will be a smoothed version of the input wave.

Figure 6:
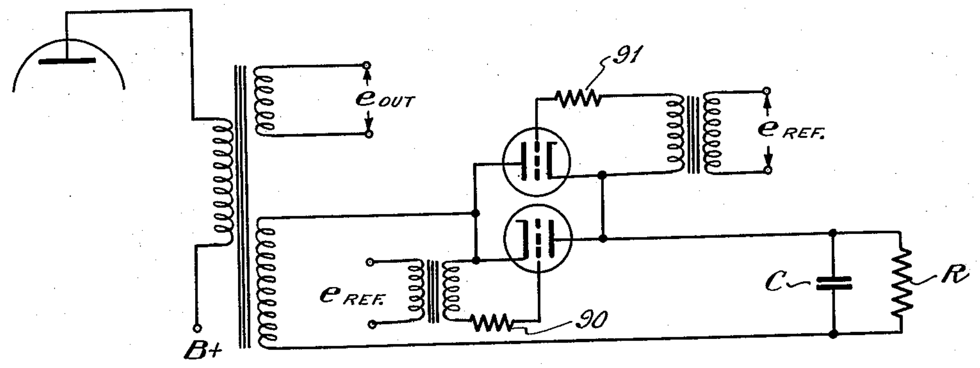
Fig. 6 is a schematic diagram of another embodiment of the present invention utilizing a switching type demodulator.

Although diodes have been shown as the non-linear elements in the half-wave demodulator shown in Fig. 2 and in the full-wave version shown in Fig. 4, it should be understood that any conventional bi-lateral phase-sensitive demodulating circuit may be used. For instance the well known switching type demodulator such as shown in Fig. 6 may be utilized. In this embodiment of the invention, the reference voltage is applied to the grids of a pair of triodes, one being shifted 180° in phase. One triode is therefore blocked for one polarity of signal, the other turned full-on. If the reference voltage is made several times larger than is necessary to cut off the plate current of the tubes on the negative half cycle, fluctuation and unbalance of the reference voltage have no effect on the output. Series grid resistors 90 and 91 are used to limit grid current on the positive half of the cycle, especially for a zero signal condition when the grids tend to act as anodes. An advantage of this type demodulator is that the circuit is not critical to symmetry and has no unbalance for zero signal.

Figure 7:
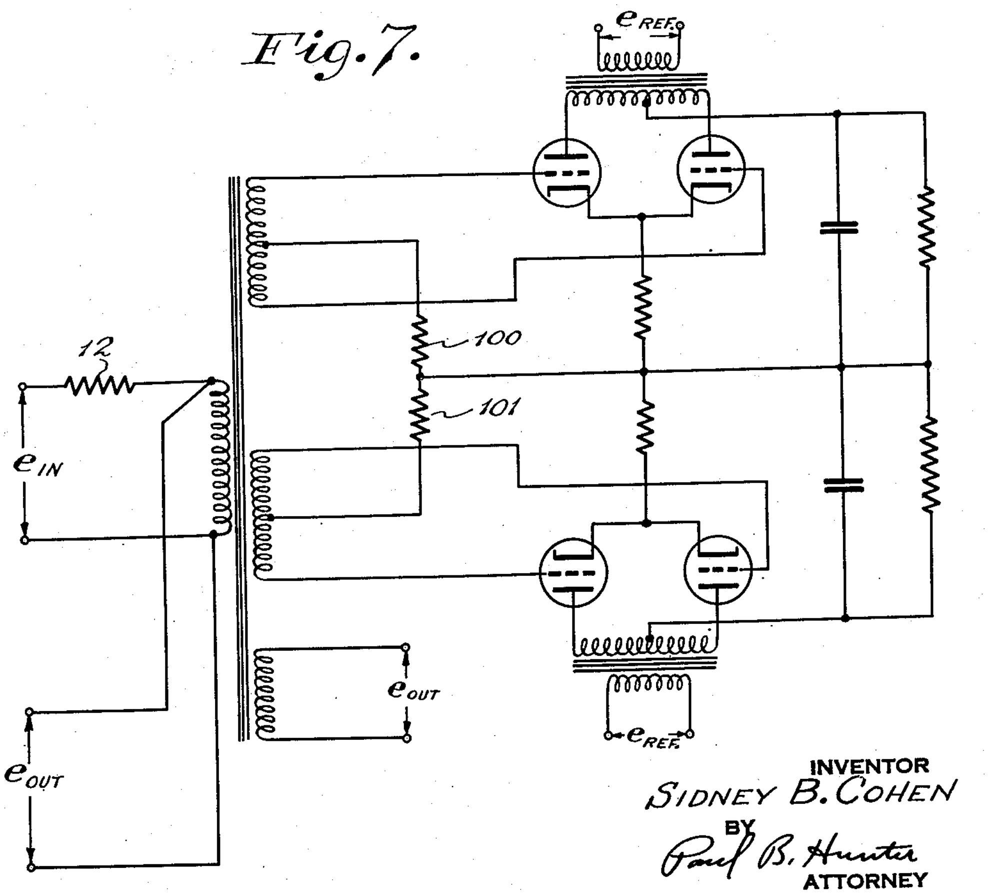
Fig. 7 is a schematic diagram of still another embodiment of the present invention utilizing a full-wave summing demodulator.

If it is desired to utilize such a summing type demodulator in a full wave system, thereby getting maximum smoothing action of the input signal, a circuit such as is shown in Fig. 7 may be used. As before, the smoothed version of the input voltage may be taken from an additional secondary winding, or it may be taken from across the input itself as shown.

From the above description and figures it is recognized that by connecting a bi-lateral circuit such as a phase-sensitive demodulator, in series with a circuit having a varying amplitude and alternating current voltage, it is possible to derive from across certain special windings or points in the circuit a voltage which is a smoothed version of the input voltage. This desirable effect is realized by virtue of circuity in which the input impedance of a certain circuit is made to vary approximately with the inverse derivative of the applied voltage itself. As a result thereof an integrating effect is achieved utilizing a minimum number of non-linear circuit elements. Further, in accordance with the teachings of this invention, this result is not in any way sensitive to change in operating frequency of the voltages such as are encountered in practical embodiments.

What is claimed is:

1. Signal smoothing apparatus comprising an input transformer having a primary winding and a center tapped secondary winding, an impedance element connected in series with said primary winding, a first non-linear element connected in series with one leg of said secondary winding, a second non-linear element connected in series with the other leg of said secondary winding, a first capacitor having one terminal connected to said first non-linear element, a second capacitor having one terminal connected to said second non-linear element, said first and second capacitors having a junction connection, a first resistor connected in parallel with said first capacitor, a second resistor connected in parallel with said second capacitor, and a reference transformer having a secondary winding connected between the center tap of said input transformer secondary winding and said junction connection, means for supplying a variable-amplitude fixed frequency alternating voltage to the series circuit comprising said impedance element and said primary winding, means for supplying to the primary winding of said reference transformer a fixed phase reference voltage at said fixed frequency, and output circuit means connected across one element of said series circuit.

2. Apparatus as in claim 1 wherein said impedance element comprises a resistor, said output circuit means being connected across said primary winding of said input transformer.

3. In combination, a source of amplitude modulated carrier wave signals, and a voltage divider including first and second series impedance branches connected across the output of said source, said first branch comprising a fixed resistor and said second branch comprising a phase detector circuit having a reference voltage signal coupled thereto of the same frequency as said carrier wave signal, an output signal being taken across one of the branches of the voltage divider.

4. A circuit for producing an A.-C. output signal that is a smoothed version of an alternating current signal of varying amplitude, said circuit comprising a voltage divider including first and second series impedance branches, said alternating current input signal being applied across the voltage divider and said alternating current output signal being taken across said second branch, said first branch comprising a constant impedance and said second branch comprising a phase-sensitive demodulator having a reference voltage signal coupled thereto of the same frequency as said alternating current input signal.

5. A circuit for producing an alternating current output signal having an amplitude which varies as a function of the changing amplitude of an alternating current input signal, said circuit comprising a voltage divider including a pair of two-terminal networks connected in series, said alternating current input signal being applied across said series connected networks, and said alternating current output signal being derived from the voltage across one of said networks, one of said networks comprising a phase-sensitive demodulator circuit.

6. A circuit as defined in claim 5 wherein the other of said two-terminal networks comprises the plate resistance of an electron discharge tube.

7. A circuit as defined in claim 5 wherein said demodulator circuit is a bi-lateral full wave type demodulator.

8. A circuit as defined in claim 5 wherein said demodulator circuit is a full wave switching type demodulator.

9. A circuit for producing an alternating current output signal that is a smoothed version of an alternating current input signal of varying amplitude, said circuit comprising a voltage divider including first and second series impedance branches, the input signal being applied across the voltage divider and the output signal being coupled from the voltage developed across one of the branches of the voltage divider, said first branch being a relatively fixed impedance, said second branch being a variable impedance and including a transformer having a center-tapped secondary, a first non-linear element connected in series with one leg of said secondary winding, a second non-linear element connected in series with the other leg of said secondary winding, a first energy storing means connected to the first non-linear element, a second energy storing means connected to the second non-linear element, the first and second energy storing means being connected at a common junction, and reference voltage means connected between the center tap of said secondary winding and said common junction, said variable impedance being connected as a branch of the voltage divider by means of the primary of the transformer.

10. A circuit for producing an alternating current output signal that is a smoothed version of an alternating current input signal of varying amplitude, said circuit comprising a voltage divider including first and second series impedance branches, the input signal being applied across the voltage divider and the output signal being coupled from the voltage developed across one of the branches of the voltage divider, said first branch being a relatively fixed impedance, said second branch being a variable impedance and including means for establishing a pair of equal voltages having amplitudes proportional to the instantaneous amplitude of said input signal, means for establishing a sum voltage by adding a reference voltage to one of said equal voltages, means for establishing a difference voltage by subtracting said reference voltage from the other of said equal voltages, means for rectifying said sum voltage, means for rectifying said difference voltage, capacitor means charged by the rectified sum voltage, capacitor means charged by the rectified difference voltage, and means for limiting the charging rate of said capacitor means.

References Cited in the file of this patent

UNITED STATES PATENTS

| Number | Name | Date |
|---|---|---|
| 2,259,891 | Hunt | Oct. 21, 1941 |
| 2,340,432 | Schock | Feb. 1, 1944 |
| 2,415,468 | Webb | Feb. 11, 1947 |
| 2,425,924 | Crosby | Aug. 19, 1947 |
| 2,429,216 | Bollman et al. | Oct. 21, 1947 |
| 2,540,813 | Dome | Feb. 6, 1951 |
| 2,579,286 | Adamson | Dec. 18, 1951 |

FOREIGN PATENTS

| Number | Country | Date |
|---|---|---|
| 98,803 | Sweden | May 7, 1940 |